United States Patent [19]
Chen et al.

[11] Patent Number: 5,706,321
[45] Date of Patent: Jan. 6, 1998

[54] METHOD FOR NONLINEAR OPTIMIZATION FOR GAS TAGGING AND OTHER SYSTEMS

[75] Inventors: Ting Chen, Chicago; Kenny C. Gross, Bolingbrook; Stephan Wegerich, Glendale Heights, all of Ill.

[73] Assignee: The University of Chicago, Chicago, Ill.

[21] Appl. No.: 640,699

[22] Filed: May 1, 1996

[51] Int. Cl.⁶ .................. G21C 21/02; G21C 17/04
[52] U.S. Cl. .................. 376/463; 376/251; 376/450
[58] Field of Search .................. 376/250, 251, 376/253, 260, 261, 412, 413, 450, 463

[56] References Cited

U.S. PATENT DOCUMENTS

| | | | |
|---|---|---|---|
| 4,495,143 | 1/1985 | Gross et al. | 376/251 |
| 4,764,335 | 8/1988 | Gross et al. | 376/253 |
| 5,267,276 | 11/1993 | Vujic | 376/215 |
| 5,333,157 | 7/1994 | Gross | 376/251 |
| 5,406,605 | 4/1995 | Gross | 376/463 |
| 5,586,157 | 12/1996 | Gross et al. | 376/253 |
| 5,602,886 | 2/1997 | Gross et al. | 376/253 |

OTHER PUBLICATIONS

Concentric-Sphere Design for Spacing of Tag-Gas Isotopic Ratios, Kenny C. Gross, Nuclear Technology, vol. 45, Sep. 1979.

*Primary Examiner*—Daniel D. Wasil
*Attorney, Agent, or Firm*—Foley & Lardner

[57] ABSTRACT

A method and system for providing nuclear fuel rods with a configuration of isotopic gas tags. The method includes selecting a true location of a first gas tag node, selecting initial locations for the remaining n-1 nodes using target gas tag compositions, generating a set of random gene pools with L nodes, applying a Hopfield network for computing on energy, or cost, for each of the L gene pools and using selected constraints to establish minimum energy states to identify optimal gas tag nodes with each energy compared to a convergence threshold and then upon identifying the gas tag node continuing this procedure until establishing the next gas tag node until all remaining n nodes have been established.

5 Claims, 4 Drawing Sheets

METHOD FOR NONLINEAR OPTIMIZATION FOR GAS TAGGING AND OTHER SYSTEMS

This invention was made with U.S. Government support under Contract No. W-31-109-ENG-38 awarded by the Department of Energy, and the U.S. Government has certain rights in this invention.

The present invention is directed generally to a nuclear reactor tag gas system. More particularly, the invention is directed to a method and system for nonlinear optimization of selection of gas tags for nuclear fuel rods. The method involves a nonlinear optimization using genetic algorithms based on neural networks to solve isotopic gas tagging problems. Further, the invention is concerned with a method and system for installing gas tags in nuclear reactor fuel rods and determining defective fuel rods by sensing a distinct gas released therefrom.

Gas tagging of nuclear fuel rods was developed to assist in identifying one of a large number of fuel rods which has developed defects during operation, causing release of the fuel rod tag gas into the reactor coolant system. In breeder reactors it has been possible to collect and utilize tag gases in a straightforward manner since the release of such tag gases is into a cover gas volume overlying a pool of liquid sodium which acts to cool the fuel rods. This cover gas can be sampled easily by passage directly to a coupled mass spectrometer for tag gas analysis and identification of the defective fuel rod. Further example details of operation of a breeder reactor and use of gas tags in such a reactor can be found in U.S. Pat. No. 4,495,143 at columns 6–8, and in general to a co-pending application of Ser. No. 08/541,866 also owned by the assignee of the present case, both of which are incorporated by reference herein. However, in light water reactors one cannot employ a cover gas, and, therefore, identification of the defective fuel rod typically involves reactor shutdown, removal of all the fuel rods to a remote location and leak testing of each fuel rod assembly. The downtime expense associated with such a methodology is on the order of $1 million a day. Further, in light water reactors the tag gases and other noncondensable gases must be eluted from water in which the gases are dissolved, and then purified and concentrated for mass spectrometric analysis. Such procedures add further manpower requirements and can be hazardous due to potential chemical explosions from hydrogen/oxygen byproducts by radiolytic decomposition of water, as well as the radioactivity contamination dangers. The frequency of occurrence of such events arising from defective fuel rods in light water reactors thus indicates substantial cumulative losses and problems occur each year, and improved methods are needed to identify defective fuel rods in light water reactors.

Furthermore, prior gas tag design systems for computing isotopic compositions for gas tag nodes have not permitted formulating a large number of gas tags for many fuel rods due to the increasing possibility of creating ambiguous gas tag leaker identifications (such as a plurality of leaks combining to indicate the origin is another fuel rod which has not leaked). Further, the prior art systems require too many enriched isotope additions and cannot accommodate the increased uncertainties and inaccuracies caused by unavoidable random shifts of the gas tag nodes during the physical blending process. In particular, during physical gas blending, unavoidable gas tag node shifts can occur from inaccurate pressure and flow parameters and the presence of isotopic impurities.

It is therefore an object of this invention to provide an improved method and system for establishing gas tags in nuclear reactors.

It is another object of the invention to provide a novel method and system for nonlinear optimization for gas tagging of nuclear fuel rods.

It is an additional object of the invention to provide a novel method and system for allocating gas tags to nuclear fuel rods to minimize expense associated with use of the gases for gas tagging.

It is still another object of the invention to provide a novel method and system employing a genetic algorithm of a neural net system for gas tagging and analysis of fuel rod failures using an expert system.

It is yet a further object of the invention to provide an improved method and system for automatically adjusting gas tag formulations during physical blending of gases.

It is also another object of the invention to provide a novel method and system for determining positions and compositions of gas tag nodes for nuclear reactor fuel rod assemblies by neural network analysis proceeding from node to node while maintaining required constraints under dynamic conditions for previously calculated nodes regarding position and compositions.

The method and system of the invention concerns nonlinear optimization of gas tag preparation and node placement using a genetic algorithm based neural network. The technique can be used, for example, in light water and integral fast reactors. A combination of neural networks and genetic algorithm techniques enables solving a nonlinear optimization problem. This methodology will provide improved analytic optimization with enhanced computational efficiency to minimize the possibility of ambiguous leaking fuel rod identification and with reduced overall gas tag costs. A two-dimensional neural network technique can be used to determine positions and compositions of gas tag nodes, while enforcing a sixfold analytic constraint associated with the problem. The neural network analysis proceeds from one node to the next while maintaining these constraints under dynamic conditions for the previously determined nodes with respect to position and composition. The genetic algorithm is used to continually update the dynamic equations of the neural networks retaining desirable results, while discarding unwanted results.

These and other objects, features and advantages of the invention will be apparent from the following description of the preferred embodiments taken in conjunction with its accompanying drawings described below wherein like elements have like numerals throughout the several views.

DETAILED DESCRIPTION OF PREFERRED EMBODIMENTS

Figure 1:
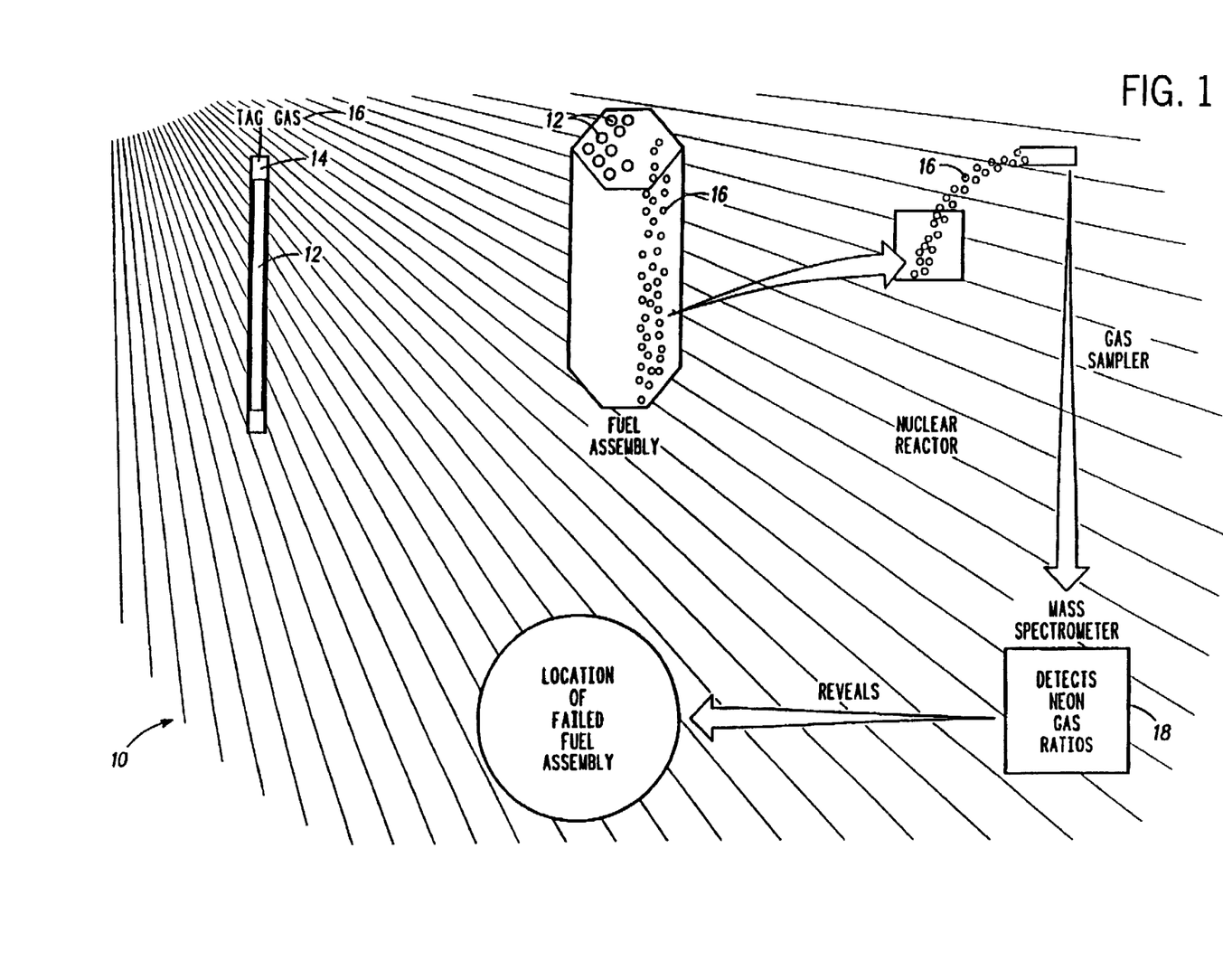
FIG. 1 is a functional block diagram of a system of gas tag utilization in a nuclear reactor.

A system for establishing gas tag nodes in nuclear reactor fuel rods and detection of tag gases from failed rods is shown generally in FIG. 1. In order to unambiguously identify a particular fuel rod 12 which has undergone failure, an isotopic gas tag 16 is typically disposed in a plenum region 14 of the fuel rod 12. This gas tag 16 consists of a mixture of isotopic noble gases which have been mixed to provide a unique identifying signature such that, upon failure of the fuel rod 12, the escaping gas tag 16 can be analyzed and related to the one particular fuel rod 12. The methodology of preparing gas tags for the large number of the fuel rods 12 can be carded out by a variety of conventional methodologies, such as are described in U.S. Pat. Nos. 4,495,143 and 5,333,157, which are incorporated by reference herein. As further shown in FIG. 1, the escaping gas tag 16 can be sampled and removed for analysis, such as by a mass spectrometer 18, to identify the composition of the tag gas 16. By comparison with the known tag gas compositions of the array of the fuel rods 12, the particular failed fuel rod 12 can be ascertained.

The sampling, isolation and analysis of the gas tag 16 can be performed in the manner described in application Ser. No. 08/541,866 at page 4, paragraph 2 et seq., and pages 5 and 6, herein specifically incorporated by reference. In the manner shown in FIG. 2 (see the Example herein), a genetic algorithm based neural network is used to carry out nonlinear optimization analysis to select gas tag nodes. This methodology constructs a neural network structure and a shaped energy surface whose minima correspond to optimal solutions of the selected tagging problem. This approach also provides closed form solutions to constrained gas tagging problems, such as an optimal distribution of tag nodes characterized by points on surfaces of hyperspheres in multidimensional space. When optimal locations of distributed points are achieved, a set of problem constraints, such as minimum distances between points, must be satisfied. In the system shown in FIG. 1, a gas tagging method is used in a nuclear reactor to identify the failed fuel rods 12. The noble gas tag nodes are distributed on surfaces, such as two concentric spheres as described in the Example. The theoretically optimal locations of the gas tag nodes are calculated in such a way that the possibility of ambiguous leak identification during multirod failure events is minimized, while isotopic enrichment requirements of the noble gases for the gas tags is reduced. The calculated positions of the gas tag nodes typically must be modified during the physical gas blending process to accommodate uncertainties and inaccuracies caused by unavoidable random shifts of the gas tag nodes.

To overcome uncertainties of gas tag mixing and formulation, a genetic algorithm based neural network is used to construct gas tag nodes. An iterative approach is used to converge to a solution which avoids constructing undesirable gas tag nodes. The actual gas tag nodes created are measured by mass spectrmetric sampling, and thus the discrepancies from identity are determined. The subsequent created gas tag nodes are therefore adjusted to avoid potential ambiguities, if such adjustments were not made by the method which minimizes the distance between all nodes and their nearest neighbors.

The subject methodology solves three-dimensional rigid motion problems using neural network techniques by specifying matching constraints between two static images in order to ensure establishing stable and coherent point correspondence. In the preferred embodiment a two-dimensional Hopfield neural network is configured to enforce these constraints. Minimization of the Hopfield network energy function leads to the optimal matching solution. A set of neural networks which are similar in structure and dynamics, but different in physical size, are used to solve the problem of nonrigidity in local deformation estimates. These constraints are specified to ensure a stable and globally consistent estimation of the local deformations. The neural networks then find the optimal deformation matrices which satisfy the constraints for all the points on the surface of a nonrigid object.

In the preferred embodiment, establishing gas tag nodes involves defining six problem constraints:

(1) Uniqueness constraint 1. There is one, and only one, optimal location for each gas tag node to be blended;

(2) Uniqueness constraint 2. The total number of optimal locations for gas tag nodes to be blended is equal to the number of these gas tag nodes;

(3) Cost effective constraint. The gas tag nodes should be distributed in the most compact configuration to reduce the cost of noble gases used to create the tags;

(4) Analytical constraint 1. The closest distance between any node and the tie-line connecting any other two gas tag nodes in the system should be greater than a minimum separation distance standard;

(5) Analytical constraint 2. No four nodes in the system can lie in the same plane; and (6) Analytical constraint 3. No three nodes in the system lie on a straight line.

After the problem constraints have been explicitly defined, the next step is to select a suitable computational model which reflects these constraints and eventually leads to an optimal problem solution that satisfies the constraints. In the preferred embodiment, a conventional two-dimensional Hopfield type neural network model is used. A Hopfield network comprises a single layer of neurons, with symmetric weights between each pair of neurons. Based on the well known, conventional Liapunov theory, the Hopfield model always converges to stable states in which outputs of the neurons remain unchanged. After a mapping between the problem domain and the final stages of the neural networks is found, an energy function is constructed to embed the constraints defined. Minimization of this energy function results in stable optimal solutions of the problem. The algorithmic fundamentals follow a known, conventional formalism which we describe below. The explanation includes a discussion of the matching two different frames, extraction of motion parameters, extension to a multiframe approach and examples of application of the formalism are provided for both synthetic and real images.

Figure 3:
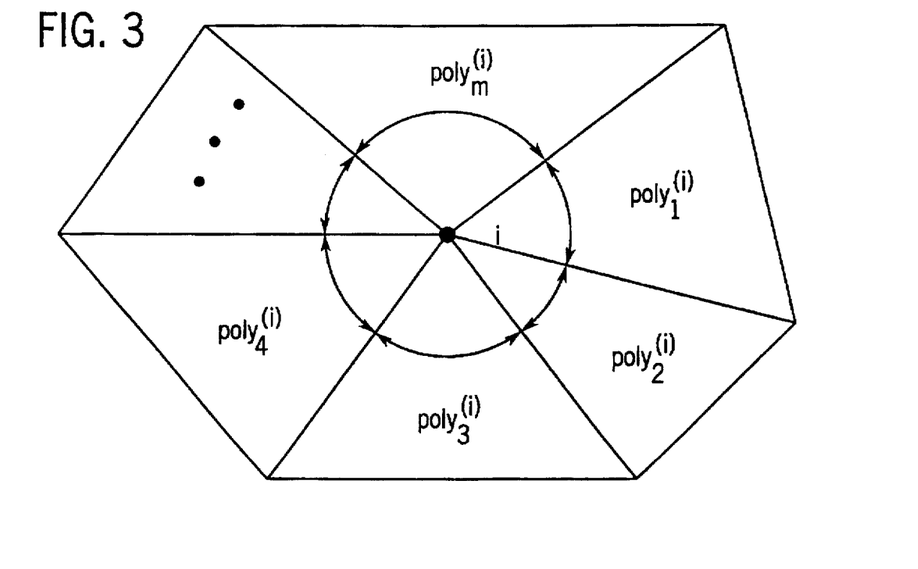
FIG. 3 illustrates polygons adjacent to an i-th point of a frame of three-dimensional space.

Matching between two frames includes matching constraints and a neural network based computational technique. Let $p_1$ and $p'_1$ be vectors in three-dimensional space and represent a unique point in frame 1 and frame 2, respectively. The goal here is to find reliable descriptors relevant to a three-dimensional point and define the constraints of the mapping from $p_1$ and $p'_1$. For pointwise matching, the following two measures are used to represent the attributes of each point: (1) the Euclidian distance between the point and the centroid of the object, and (2) the angles of polygons adjacent to the point (see FIG. 3). The former is explicitly defined as a global feature, and the latter a local feature. Since the adopted global feature is not scale invariant, a normalization process is needed. All the extracted features should be under the following rigidity constraint:

$\|p_1-C_1\|=\|p_1-C_2\|$, where $C_1$ and $C_2$ are the controids of the object in frame 1 and frame 2, respectively; angle(poly$_j^{(i)}$) =angle(poly$_j^{(i)'}$), $\forall i$, $j=1,2,3,\ldots,m$, where m is the total number of polygons which are adjacent to the i-th point as shown in FIG. 3, and poly$_j^{(i)}$ and poly$_j^{(i)'}$ are the j-th polygon adjacent to the i-th point in frame 1 and frame 2, respectively. Under the assumption of one-to-one matching, the problem constraint amounts to the uniqueness of matching, i.e., each point in one frame eventually matches only one point in the other frame, or no more than two points in one frame should match the same point in the other frame.

After the matching constraints have been explicitly defined, the next step is to select a suitable computational model that reflects these two matching constraints and eventually leads to optimal matching solutions between two frames. A two-dimensional array of neurons is used here where the output of each neuron represents a support for a match between two points $p_i\{1 \leq i \leq N_1\}$ and $p'_k\{1 \leq k \leq N_2\}$ in different time frames, where $N_1$ is the total number of points in frame 1, and $N_2$ need not be identical.

Figure 4:
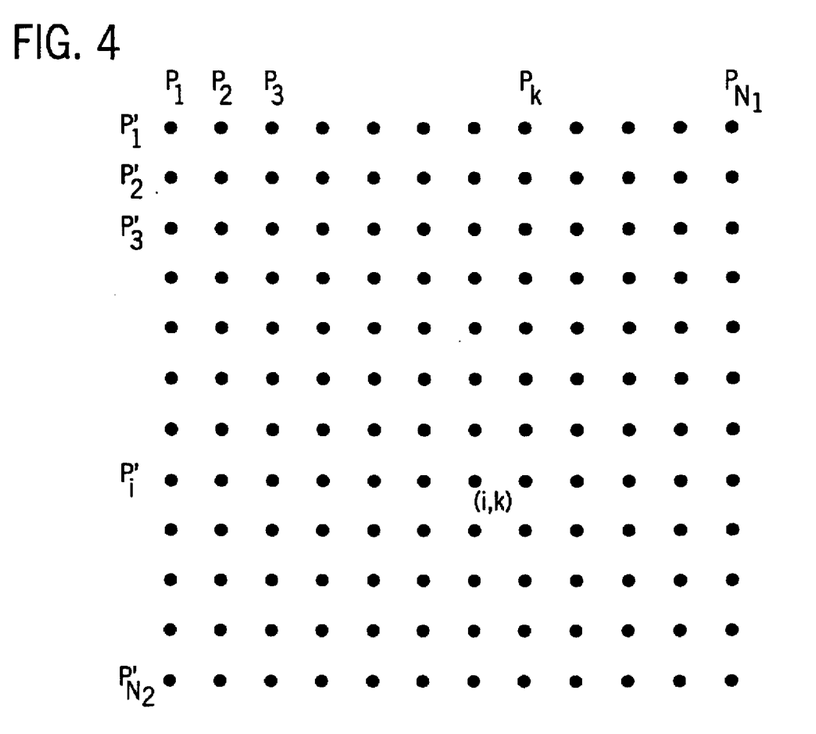
FIG. 4 illustrates a Hopfield network model for matching between two frames.

In the two-dimensional array neural network, each column corresponds to a feature of the data in frame 1, while each row corresponds to a feature of the data in frame 2. If there are $N_1$ data points in frame 1 and $N_2$ data points in frame 2, the neural network is an $N_2 \times N_1$ two-dimensional array as shown in FIG. 4. The final output of the neuron at position (i,k) in the network reflects the support for the hypothesis of mapping the k-th neuron in frame 1 to the i-th neuron in frame 2. Matching between two frames can be formulated as minimizing an energy, or cost, function. In other words, minimization of this energy (cost) function results in stable pairings that are optimal with respect to the constraints defined in the previous section. The energy is expressed as follows:

$$E = \frac{A}{2} \sum_i \sum_k \sum_{l \neq k} V_{ik}V_{il} + \frac{B}{2} \sum_i \sum_k \sum_{j \neq i} V_{ik}V_{jk} + \qquad (1)$$

$$\frac{C}{2} \sum_i \sum_k \sum_{j \neq i} \sum_{l \neq k} M_{ikjl}V_{ik}V_{jl} + \frac{D}{2} \sum_i \sum_k N_{ik}V_{ik}$$

where A, B, C, D are constants, $M_{ikjl}$ is the compatibility measurement, $N_{ik}$ is the magnitude of the point-to-point constraint, and $V_{ik}$ is the output of the neuron at position (i,k), which is equal to "1" if the mapping is established between the i-th point in frame 2 and the k-th point in frame 1, or equal to "0" otherwise.

The first term in Equation (1) is zero if and only if each row with index i contains not more than one "1." Similarly, the second term ensures that there is not more than one "1" in each column with index k of the network. These two terms together represent the problem constraint described in the previous section. The third term is a compatibility constraint. This is also a measure of the equality of the rigidity constraint among active hypotheses. $M_{ikjl}$ can be defined as a summation of threshold functions:

$$M_{ikjl} = c_1 f_g(p_i', p_k) + c_2 f_g(p_i', p_k) + c_3 f_l(p' , p_k) + c_4 f_l(p_j', p_l') \text{ where } \sum_{i=1}^{4} c_i = 1.$$

$$f_g(p_i', p_k) = \{1 \text{ if } \|p_i' - C_2\| = \|p_k - C_1\| < \epsilon_1, \text{ otherwise} = -1$$

$$f_l(p_i', p_k) = \{1 \text{ if } \max_n \|\text{angle}(\text{poly}_n^{(i)}) - \text{angle}(\text{poly}_n^{(k)})\| < \epsilon_2.$$
$$1 \leq n \leq m$$
$$-1 \text{ otherwise}$$

and $\epsilon_1$ and $\epsilon_2$ are thresholds. The fourth term in Equation 1 ensures that the cost of mapping a point $p'_i$ in frame 2 to a point $p_k$ in frame 1 is minimal.

Comparing the energy function in Equation 1 with the standard two-dimensional Hopfield network energy function $E = -\frac{1}{2} \sum_i \sum_k \sum_{j \neq i} \sum_{l \neq k} T_{ikjl} V_{ik} V_{jl} - \sum_i \sum_k I_{ik} V_{ik}$, the connection matrix is found to be $T_{ikjl} = -A\delta_{ij} - B\delta_{kl} - CM_{ikjl}$, where $$\delta_{ij} = \{1 \text{ if } i=j$$

0 otherwise, and $$I_{ik} = -(D/2)N_{ik}.$$

In the continuous model of Hopfield neural networks, the relationship of input-output voltages for a neuron at position (i,k) is given as $V_{ik} = g(\mu_{ik})$ where g is a sigmoid function. The differential equation describing the dynamics of a neuron is $du_{ik}/dt = \sum_j \sum_l T_{ikjl} V_{jl} - u_{ik}/r + I_{ik}$, where r is a constant, $V_{ik} = g(u_{ik}) = [1 + \exp(-2u_{ik}/u_o)]^{-1}$, and $u_o$ is a constant. Substituting $T_{ikjl}$ into the equation, the following equation is obtained:

$$\frac{du_{ik}}{dt} = -A \sum_l V_{il} - B \sum_j V_{jk} - C \sum_j \sum_l M_{ikjl} V_{jl} \qquad (2)$$

By updating the value of $u_{ik}$ using the fourth order Runge-Kutta method and adopting the freezing criterion and time-out test as the termination strategies, the optimal match between the two frames can then be achieved.

Concerning extraction of motion parameters based on point correspondence, given a rigid object represented by N feature points, the correspondences among the points in two different time instants, i.e., $p_i \leftrightarrow p'_i$, $\{1 \leq i \leq n\}$ (where n is the number of matching pairs and $n \leq N$) can be established after the matching process. A precise mathematical model of the three-dimensional rigid motion is: p'; +Rot $p_i$+Tran, where Rot denotes a three-dimensional rotation matrix and Tran denotes a three-dimensional translation vector. This transformation can be decomposed into a rotation followed by a translation, i.e., $p''_i$=Rot $p_i$ and $p'_i = p''_i$+Tran. The translation vector is simply the displacement between the object centroids in two time frames. The rotation matrix Rot used here is in a very general form. Given any arbitrary rotational axis k with any rotational angle θ, the rotation matrix can be defined as follows:

$$Rot = [n, o, a] = \begin{bmatrix} n_x & o_x & a_x \\ n_y & o_y & a_y \\ n_z & o_z & a_z \end{bmatrix} = \qquad (3)$$

$$\begin{bmatrix} k_x^2 \text{vers}\theta + \cos\theta & k_x k_y \text{vers}\theta + k_z \sin\theta & k_x k_z \text{vers}\theta + k_y \sin\theta \\ k_x k_y \text{vers}\theta + k_z \sin\theta & k_y^2 \text{vers}\theta + \cos\theta & k_y k_z \text{vers}\theta - k_x \sin\theta \\ k_x k_z \text{vers}\theta - k_y \sin\theta & k_y k_z \text{vers}\theta + k_x \sin\theta & k_z^2 \text{vers}\theta + \cos\theta \end{bmatrix}$$

where $\text{vers}\theta = 1 - \cos\theta$, $k = [k_x, k_y, k_z]^T$, and k is an normalized vector. k and θ can be obtained as: $\cos\theta = \frac{1}{2}(n_x + o_y + a_z - 1)$, $$k_x = \text{sgn}(o_z - a_y) \sqrt{(n_x - \cos\theta)/(1 - \cos\theta)} \quad ,$$

$$k_y = \text{sgn}(a_x - n_z) \sqrt{(o_y - \cos\theta)/(1 - \cos\theta)} \quad , \text{and}$$

$$k_z = \text{sgn}(n_y - o_x) \sqrt{(a_z - \cos\theta)/(1 - \cos\theta)} \quad ,$$

$$\text{where sgn}(x) = \begin{cases} + \text{ if } x \geq 0 \\ - \text{ othrwise.} \end{cases}$$

Extracting motion parameters between two frames is, in fact, a process of deriving the translation vector Tran and the rotation matrix Rot based on point correspondences obtained at the matching stage. The translation vector Tran can be easily obtained by calculating the displacement of the object geometrical centroid positions in two frames. The remaining problem then is how to drive the rotation matrix Rot based on the available information. In general, this problem can be expressed as: Minimize $\Sigma_{i=1}^n \|p'_i - \text{Rot} \cdot p_i\|$.

Regarding a neural network based approach, to avoid the complexity of the quaternion-based scheme, a computational model based on neural networks is proposed. A three-layered learning neural network is constructed (shown in FIG. 5) based on the concept of least mean squared error performance learning rule. The details of the network are described hereinafter.

Figure 5:
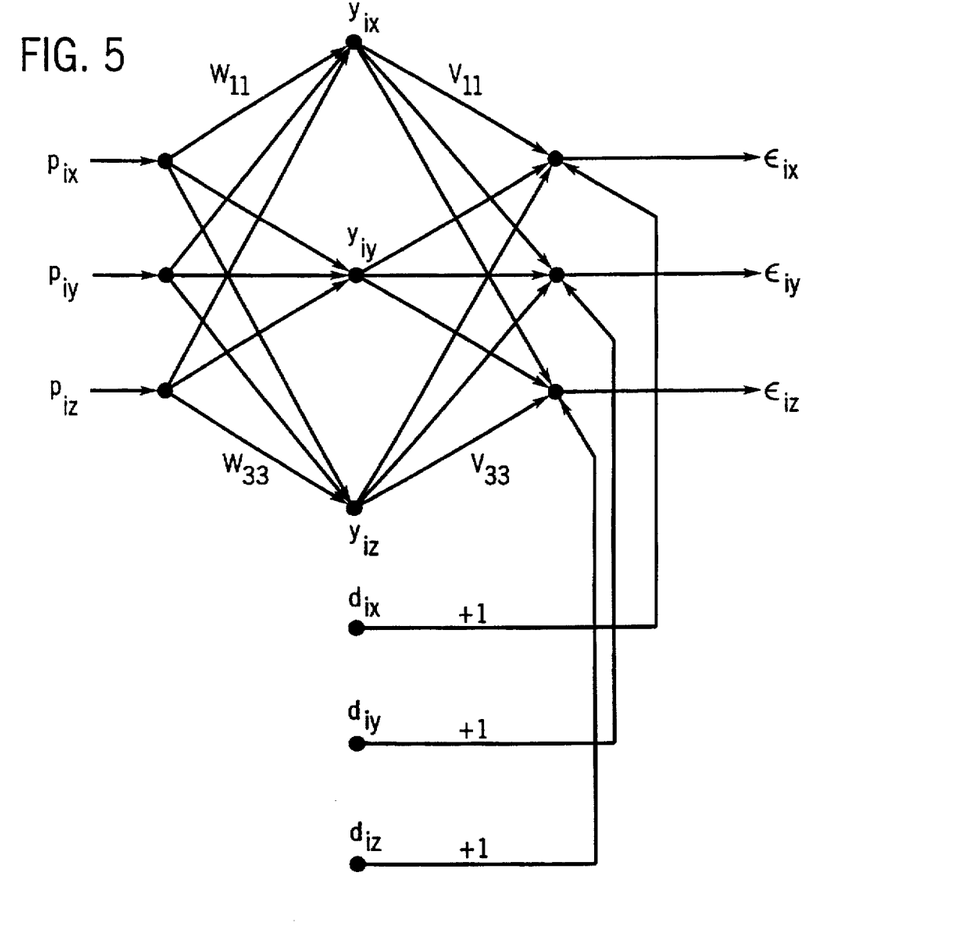
FIG. 5 illustrates graphically a Delta learning model for extracting motion parameters.

From Equation (3), we can obtain $\text{Rot} \cdot p_i = [n,o,a] \cdot [p_{ix}, p_{iy}, p_{iz}]^T = [R_x \cdot p_i, R_y \cdot p_i, R_z \cdot p_i]^T$, where $R_x = [n_x, o_x, a_x]$, $R_y = [n_y, o_y, a_y]$, $R_z = [n_z, o_z, a_z]$, and $\text{Rot} = [R_x, R_y, R_z]^T$. In the proposed three-layered neural network, the inputs to the first (or input) layer are the components of the point vector $p_i = [p_{ix}, p_{iy}, p_{iz}]^T$. A 3×3 weight matrix is constructed between layer 1 and layer 2 as $W = [W_1, W_2, W_3]^T$, where $W_1 = [w_{11}, w_{12}, w_{13}]$, $W_2 = [w_{21}, w_{22}, w_{23}]$, $W_3 = [w_{31}, w_{32}, w_{33}]$, and $w_{ij}$ represents the sense and strength of the connection between neuron j of layer 1 and neuron i of layer 2. Let $y_i = [y_{ix}, y_{iy}, y_{iz}]^T$ be the actual outputs of layer 2, $y_i = [W_1 \cdot p_i, W_2 \cdot p_i, W_3 \cdot p_i]^T$. The weight vector matrix V between layer 2 and layer 3 is defined as $V = [V_1, V_2, V_3]^T$, where $V_1 = [v_{11}, v_{12}, v_{13}]$, $V_2 = [v_{21}, v_{22}, v_{23}]$, $V_3 = [v_{31}, v_{32}, v_{33}]$, and $V_{ij}$ denotes the sense and strength of the connection between neuron j of layer 2 and neuron i of layer 3. Let the weight matrix V be a negative unit matrix, i.e., $$V_{ij} = \begin{cases} -1 & \text{if } i = j \\ 0 & \text{otherwise.} \end{cases}$$

Let $d_i = [d_{ix}, d_{iy}, d_{iz}]^T$ be the ideal outputs of layer 2 which are the components of the point vector $p''_i$, i.e., $d_i = p''_i = [p''_{ix}, p''_{iy}, p''_{iz}]^T$. By feeding $d_i$ to layer 3 as additional inputs, the error $\epsilon$, and the output of layer 3 can be obtained: $\epsilon_i = [\epsilon_{ix}, \epsilon_{iy}, \epsilon_{iz}]^T = d_i + [V_1 \cdot y_i, V_2 \cdot y_i, V_3 \cdot y_i]^T = d_i - y_i = [p'_{ix} - W_1 \cdot p_i, p'_{iy} - W_2 \cdot p_i, p'_{iz} - W_3 \cdot p_i]^T$. By applying the least mean squared algorithm and taking $\epsilon^2$ itself as an estimate of $\overline{\epsilon^2}$, the estimated gradients can be obtained:

$$\nabla_{ix} = \partial \epsilon_{ix}^2 / \partial W_1 = -2\epsilon_{ix} p_i, \quad \nabla_{iy} = \partial \epsilon_{iy}^2 / \partial W_2 = -2\epsilon_{iy} p_i,$$
$$\nabla_{iz} = \partial \epsilon_{iz}^2 / \partial W_3 = -2\epsilon_{iz} p_i$$

The updating rule for the weight matrix W can be described as follows:

$$W^{(t+1)} = [W_1^{(t)} + 2\mu\epsilon_{ix}^{(t)} p_i, W_2^{(t)} + 2\mu\epsilon_{iy}^{(t)} p_i, W_3^{(t)} + 2\mu\epsilon_{iz}^{(t)} p_i]^T \quad (4)$$

where $\mu$ is the learning rate, and t represents the number of iterations. The relationship between the weight vector W and the unknown rotation matrix Rot can be characterized as:

$R_x = W_1$, $R_y = W_2$, $R_z = W_3$, and $W = [W_1, W_2, W_3]^T = [R_x, R_y, R_z]^T = \text{Rot}$.

Regarding a multiframe approach, when the quality of data acquisition is poor, noise is inevitable; and the measurement primitives estimated from the data are not sufficiently accurate and reliable for motion parameter determination. One obvious way to compensate for the inaccuracy of data is to use multiple frames.

Assume that objects are moving with a constant velocity translational motion. Using the same techniques described hereinbefore, the Hopfield neural network matching model can be applied to every two successive frames in a multiframe sequence to establish correspondences. Assume $n_1, n_2, \ldots, n_{N-1}$ are numbers of matching pairs between frame 1 and frame 2, frame 2 and frame 3, ..., frame (N-1) and frame N, respectively. If the sequence consists of N frames, the total number of matching pairs available is $n = n_1 + n_2 + \ldots + n_{N-1}$. Given the characterization of the performance learning law, the implementation of the multiframe approach proposed here is rather easy. If, in the two-frame approach, Equation (4) is applied, and the weight vector adjusted using successive replacement in each training epoch consisting of $n_1$ training patterns from frame 1 and frame 2, then the multiframe approach can be simply conducted by increasing the training patterns in each training epoch from $n_1$ to n. The structure of the designed neural network remains the same. The algorithm can be summarized as follows: (1) Establish point correspondences using the Hopfield matching network for every two successive frames. (2) Combine all matched pairs obtained from each two-frame matching and feed them as inputs into the proposed learning neural network. (3) Compute motion parameters through the process of updating the weight vectors of the proposed learning neural network.

Figure 6:
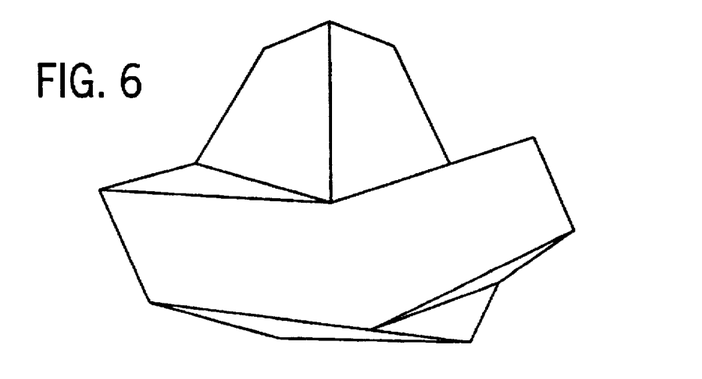
FIG. 6 illustrates a range image of a real, rigid object.

The following test results are based on the experiments conducted on four sets of synthetic objects 1–4, and a real range image shown in FIG. 6. The parameters used in Equation (1) are A=1, B=1, C=-1, D=-1, $N_{ik}$=4 and $c_1 = c_2 = 0.3$, $c_3 = c_4 = 0.4$, $\epsilon_1 = \epsilon_2 = 0.01$ for $M_{ikjl}$. The Hopfield network is able to converge to the optimal solution under ten iterations for all data sets tested. In Equation (4), the learning rate $\mu$ is set at 0.001. The proposed learning neural network also converges very fast to the optimal solutions. For all the test data available, the iteration number is always under 200, and the computational time takes only a few seconds on a conventional Sun-3 workstation. The results based on the two-frame approach conducted on both synthetic and real objects are summarized in the following table:

| Object | Ideal results | Test results |
|---|---|---|
| Object 1 | k = [0, 0, 1]$^T$ | k = [0.066695, 0.032826, 0.997233]$^T$ |
| | θ = 90° | θ = 90.174210° |
| | k = [0.3652, 0.9129, −0.1826]$^T$ | k = [0.364519, 0.911300, −0.191462]$^T$ |
| | θ = 135° | θ = 135.105652° |
| | Tran = [1, 3, −2]$^T$ | Tran = [1, 3, −2]$^T$ |
| Object 2 | k = [0.5773, 0.5773, 0.5773]$^T$ | k = [0.583216, 0.578122, 0.570644]$^T$ |
| | θ = 90° | θ = 90.644882° |
| | k = [0.5773, 0.5773, 0.5773]$^T$ | k = [0.583216, 0.578122, 0.570644]$^T$ |
| | θ = 90° | θ = 90.644882° |
| | Tran = [8, 0, 0]$^T$ | Tran = [8, 0, 0]$^T$ |
| Object 3 | k = [0.2673, 0.5345, 0.8018]$^T$ | k = [0.297266, 0.533019, 0.792165]$^T$ |
| | θ = 45° | θ = 45.418789° |
| | Tran = [2, 0, 1]$^T$ | Tran = [2, 0, 1]$^T$ |
| | k = [0.8729, −0.4364, 0.2182]$^T$ | k = [0.870368, −0.445195, 0.210382]$^T$ |

| Object | Ideal results | Test results |
|---|---|---|
| FIG. 4 | θ = 120°<br>Tran = $[-1, 0, -3]^T$<br>k = $[0.5182, 0.7826, -0.3450]^T$<br>θ = 118°<br>Tran = $[0, 0, 0]^T$ | θ = 120.184723°<br>Tran = $[-1, 0, -3]^T$<br>k = $[-0.522871, 0.781697, -0.339936]^T$<br>θ = 118.276428°<br>Tran = $[-0.000001, -0.000000, 0.000001]^T$ |

A sequence of five frames was created for synthetic object 4. Each successive frame was obtained from the previous one based on a rotational axis k=$[1, 1, 1]^T$ and a rotational angle θ=10°. Two tests were conducted for comparison; the first used the two-frame approach, and the second the multiframe approach. A comparison of these two experimental results with the ideal one confirmed that the result from the multiframe method is obviously more accurate than that from the two-frame method.

Since the continuous model of the constructed neural networks is used, it is always crucial to determine how to update the dynamic equations of these neural networks. This can be accomplished by applying the well known Runge-Kutta method, but this method is problematic, especially when the shape of problem space is unknown and the solution surface contains many local minima.

In the preferred embodiment, the method applies genetic algorithms to update the dynamics of neural networks. Genetic algorithms allow random walks on the unknown solution surface in a parallel and computationally efficient manner and therefore provide a powerful search strategy to identify the global minimum which corresponds to the optimal problem solution. The genetic algorithm maintains a set of trial solutions, also called chromosomes, and forces them to evolve toward an acceptable solution. First, a representation for feasible solutions must be developed. Once an initial random population is obtained, the algorithm then uses "survival of the fittest" as well as old knowledge in the gene pool to improve each generation's ability to solve the problem. This improvement is achieved through a four-step process of evaluation, reproduction, breeding and mutation.

EXAMPLE

Figure 2:
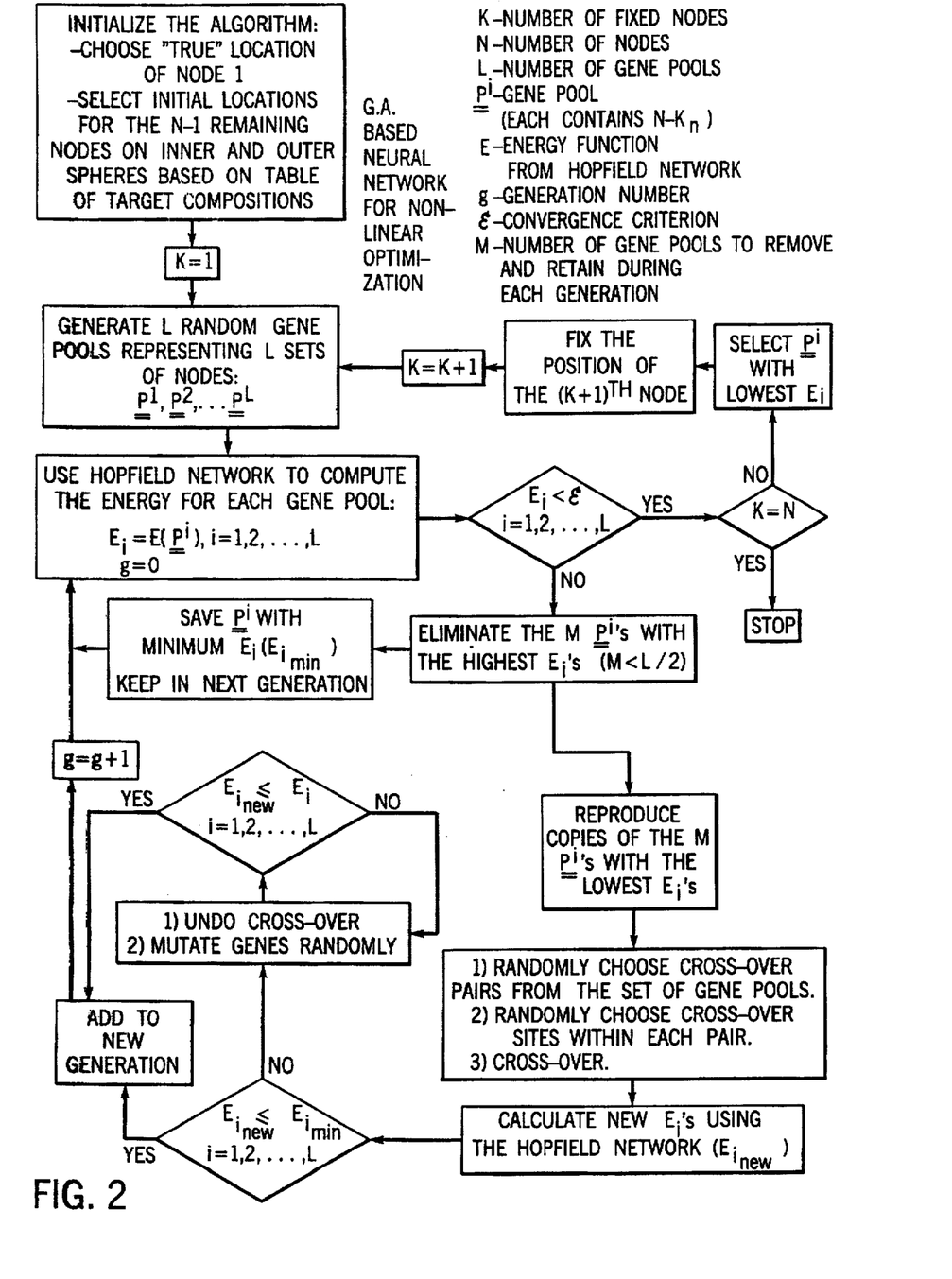
FIG. 2 is a functional block flow diagram of a genetic algorithm based neural network for nonlinear optimization.

A genetic algorithm based neural network for nonlinear optimization is shown in the flow diagram of FIG. 2. This particular flow diagram shows how the algorithm can apply to the well-known, conventional concentric sphere gas tag node locating problem. The algorithm uses a genetic algorithm for searching the solution space and a Hopfield neural network for defining a cost (or energy) function that incorporates all of the constraints and goals of the problem.

The first step of the algorithm is to initialize the system. First, node number 1 is chosen and kept fixed, and then the remaining N-1 nodes are given an initial position on either the inner or outer sphere. Next a set of L randomly generated gene pools are created, each representing a realization of the locations of the N-1 remaining nodes. Each gene pool is applied to the input neurons of the Hopfield neural network. Next the energy function is evaluated using these inputs. The goal is to minimize the energy function by selecting the optimal tag nodes based on the constraints. Each one of the values for the energy function is compared to a convergence threshold, and if any one of them satisfy the condition, the algorithm has found the next location for a node. Then the procedure repeats using the remaining N-2 nodes and then N-3 and so on, until all nodes are fixed. If none of the energy values satisfy the convergence condition, the algorithm uses genetic algorithm rules to create a new set of gene pools (saving the best gene pools from the previous generation).

The new pools are applied to the input of the Hopfield network as described previously. This is continued until the convergence criterion is met, adding another optimally placed tag node to the system. Then the algorithm continues using the remaining nodes until all tag nodes are found.

While preferred embodiments of the invention have been shown and described, it will be clear to those skilled in the art that various changes and modifications can be made without departing from the invention in its broader aspects as set forth in the claims provided hereinafter.

What is claimed is:

1. A method of generating a configuration design of gas tag nodes for nuclear fuel rods, the nodes being characteristic of a unique set of tag gas compositions, comprising the steps of:

(a) selecting a true location of a first node characteristic of an isotopic gas tag;

(b) selecting initial locations for (n-1) remaining nodes based on a table of target gas tag compositions;

(c) generating L random gene pools representing L sets of nodes, $p^l \ p^L$;

(d) applying a Hopfield network for computing an energy for each of said L gene pools and repeating said computing step to minimize said energy using selected constraints to determine optimal gas tag nodes;

(e) each value of said energy being compared to a convergence threshold and upon achieving a minimum energy a next gas tag node is established; and (f) repeating said steps (d) and (e) using the remaining n-2 nodes until establishing the next gas tag node and thereafter continuing until all of the n nodes have been established, thereby establishing the configuration design of gas tag nodes.

2. The method as defined in claim 1 further including the step of creating a new set of gene pools if no values of said energy satisfy the convergence condition.

3. The method as defined as claim 2 further including the step of saving best values of said gene pools upon creating said new set of gene pools.

4. The method as defined in claim 3 wherein said new set of gene pools are applied to the input of the Hopfield network.

5. The method as defined in claim 1 wherein said selected constraints include (a) there is only one optimal location for each said tag gas node to be blended, (b) a total number of optimal locations for said gas tag nodes to be blended is equal to the number of said gas tag nodes, (c) said gas tag nodes are to be distributed in the most compact configuration for reducing cost of noble gas used to create said gas tags, (d) the closest distance between any said gas tag node and the line connecting any other two gas tag nodes should be greater than a minimum separation distance, (e) no four gas tag nodes lie in any one plane and (f) no three gas tag nodes lie on a straight line.

* * * * *

UNITED STATES PATENT AND TRADEMARK OFFICE
CERTIFICATE OF CORRECTION

PATENT NO. : 5,706,321
DATED : January 6, 1998
INVENTOR(S) : Ting Chen et al.

It is certified that error appears in the above-identified patent and that said Letters Patent is hereby corrected as shown below:

In Column 1, before the first word of the title, insert "IMPROVED ".
In Column 3, line 9, delete "carded" and insert --carried--.
In Column 3, line 52, delete "spectrmetric " and insert --spectrometric--.
In Column 3, line 53, delete "identity" and insert --ideality--.
In Column 4, line 63, delete "controids" and insert --centroids--.
In Column 5, line 55, delete "$poly_n^{(t)}$" and insert --$poly_n^{(i)}$--.
In Column 6, line 47, delete "an" and insert --a--.
In Column 7, line 2, delete "$\Sigma_{i=1}^{n}$" and insert --$\Sigma_{i=1}^{n}$--.
In Column 7, line 42, delete "Wean" and insert --W can--.

Signed and Sealed this

First Day of September, 1998

Attest:

BRUCE LEHMAN

Attesting Officer

Commissioner of Patents and Trademarks